United States Patent
Nilsen

(10) Patent No.: US 7,136,372 B1
(45) Date of Patent: Nov. 14, 2006

(54) ADAPTION OF SERVICES IN A TELEPHONE NETWORK

(75) Inventor: Børge Nilsen, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/562,867

(22) Filed: May 1, 2000

(30) Foreign Application Priority Data

Apr. 30, 1999 (NO) .................................. 19992125

(51) Int. Cl.
*H04L 12/66* (2006.01)
*H04J 3/12* (2006.01)

(52) U.S. Cl. ...................................... 370/352; 370/522

(58) Field of Classification Search ................ 370/352, 370/353, 354, 355, 356, 466, 467, 469, 401, 370/522, 527, 528, 529; 709/223, 224, 225, 709/227, 228
See application file for complete search history.

(56) References Cited

U.S. PATENT DOCUMENTS

| | | | |
|---|---|---|---|
| 5,987,102 A * | 11/1999 | Elliott et al. .............. | 379/93.17 |
| 6,185,288 B1 * | 2/2001 | Wong ......................... | 379/219 |
| 6,404,746 B1 * | 6/2002 | Cave et al. .................. | 370/262 |
| 6,430,175 B1 * | 8/2002 | Echols et al. ............... | 370/352 |
| 6,430,177 B1 * | 8/2002 | Luzeski et al. .............. | 370/356 |
| 6,449,260 B1 * | 9/2002 | Sassin et al. ................ | 370/270 |
| 6,526,033 B1 * | 2/2003 | Wang et al. ................. | 370/338 |
| 6,567,398 B1 * | 5/2003 | Aravamudan et al. ...... | 370/352 |
| 6,570,870 B1 * | 5/2003 | Berstis ........................ | 370/352 |
| 6,584,093 B1 * | 6/2003 | Salama et al. .............. | 370/351 |
| 6,604,106 B1 * | 8/2003 | Bodin et al. ................ | 707/101 |
| 6,718,015 B1 * | 4/2004 | Berstis ........................ | 379/88.17 |

FOREIGN PATENT DOCUMENTS

| | | |
|---|---|---|
| EP | 0 989 705 A2 | 3/2000 |
| EP | 0 996 270 A2 | 4/2000 |
| EP | 1 000 343 A1 | 5/2000 |

OTHER PUBLICATIONS

Mizuno et al, "Advanced Intelligent Network and the Internet Combination Service and its Customization", IEICE Trans. Commun., vol. E81-B, No. 8, Aug. 1998, pp.1574-1580.

Rizzetto et al, "A Voice Over IP Service Architecture for Integrated Communications", IEEE Internet Computing, vol. 3, May 1999-Jun. 1999, pp. 53-62.

* cited by examiner

*Primary Examiner*—Chi Pham
*Assistant Examiner*—Melanie Jagannathan
(74) *Attorney, Agent, or Firm*—Nixon & Vanderhye, PLC.

(57) ABSTRACT

The present invention relates to an arrangement for improving the service architecture for a compound network, comprising several types of access, as well as comprising parallel service nodes/networks for respective access technologies, and for the purpose of making customer specific adaptations to the service layer more flexible and allowing for a more cost-effective support of access specific protocols and service, it is according to the present invention suggested that said arrangement comprises an open service control protocol allowing support of access specific protocols and services while also allowing the respective access networks to share the same access nodes and service architectures.

14 Claims, 5 Drawing Sheets

Service Node Structure

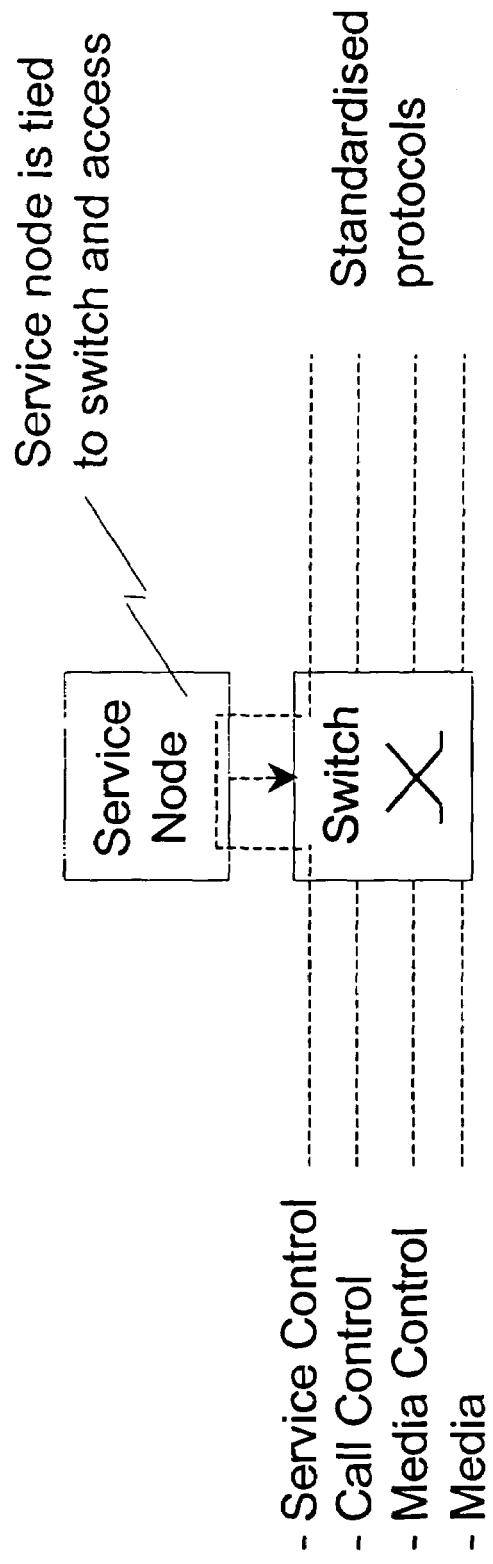
Fig-1: Access Specific Service Architecture / multiple Service Nodes
PRIOR ART

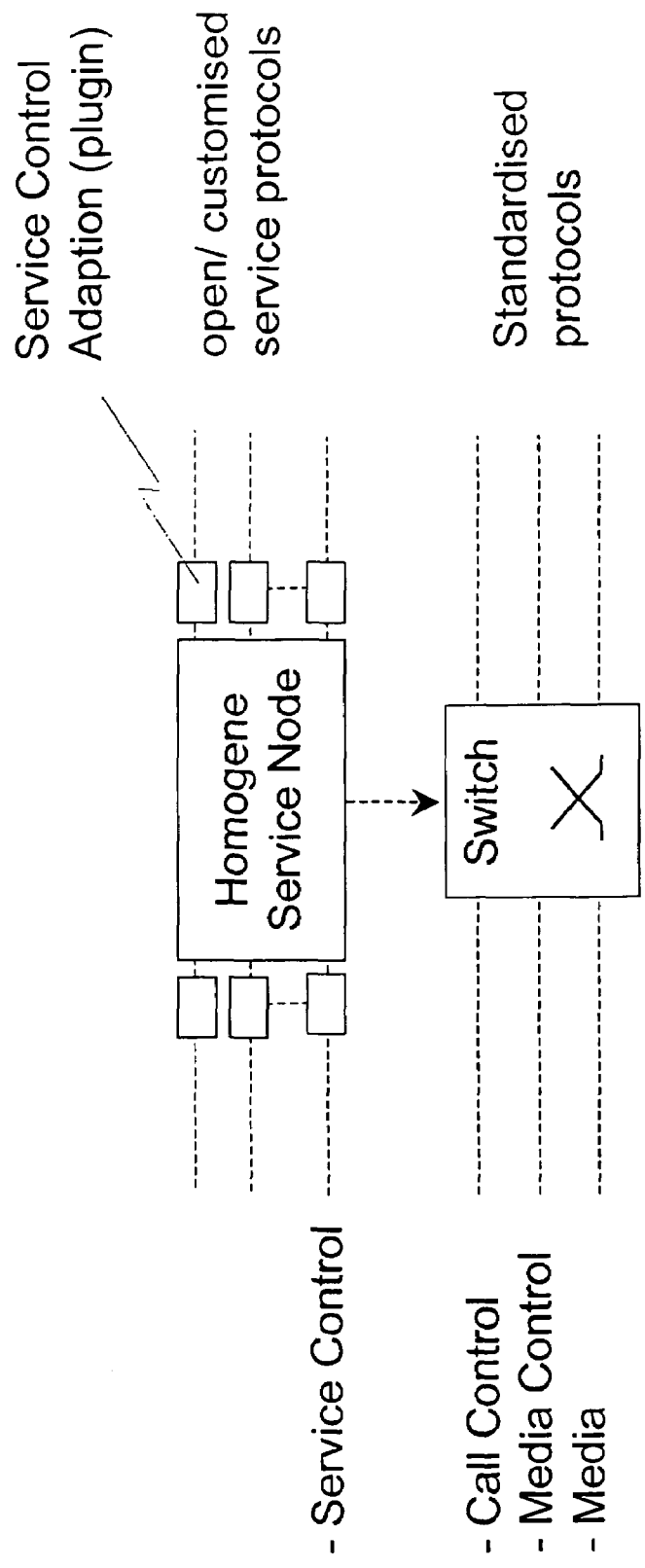
Fig-2: Homogeneous Service Architecture with Access Adaptors

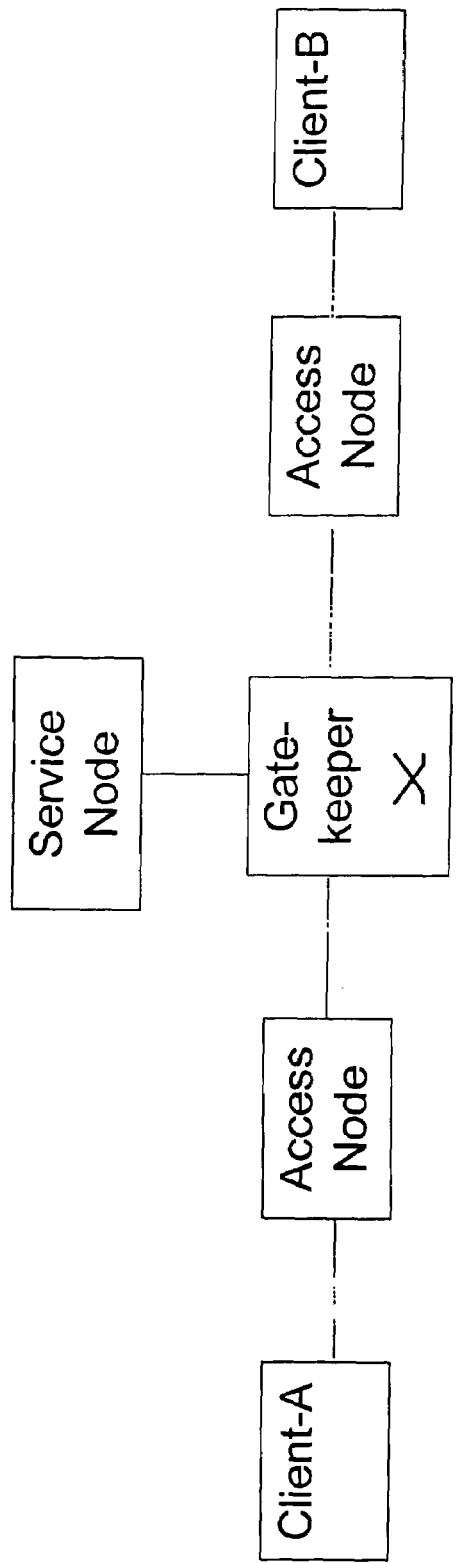
Fig-3: Simplified Reference Model

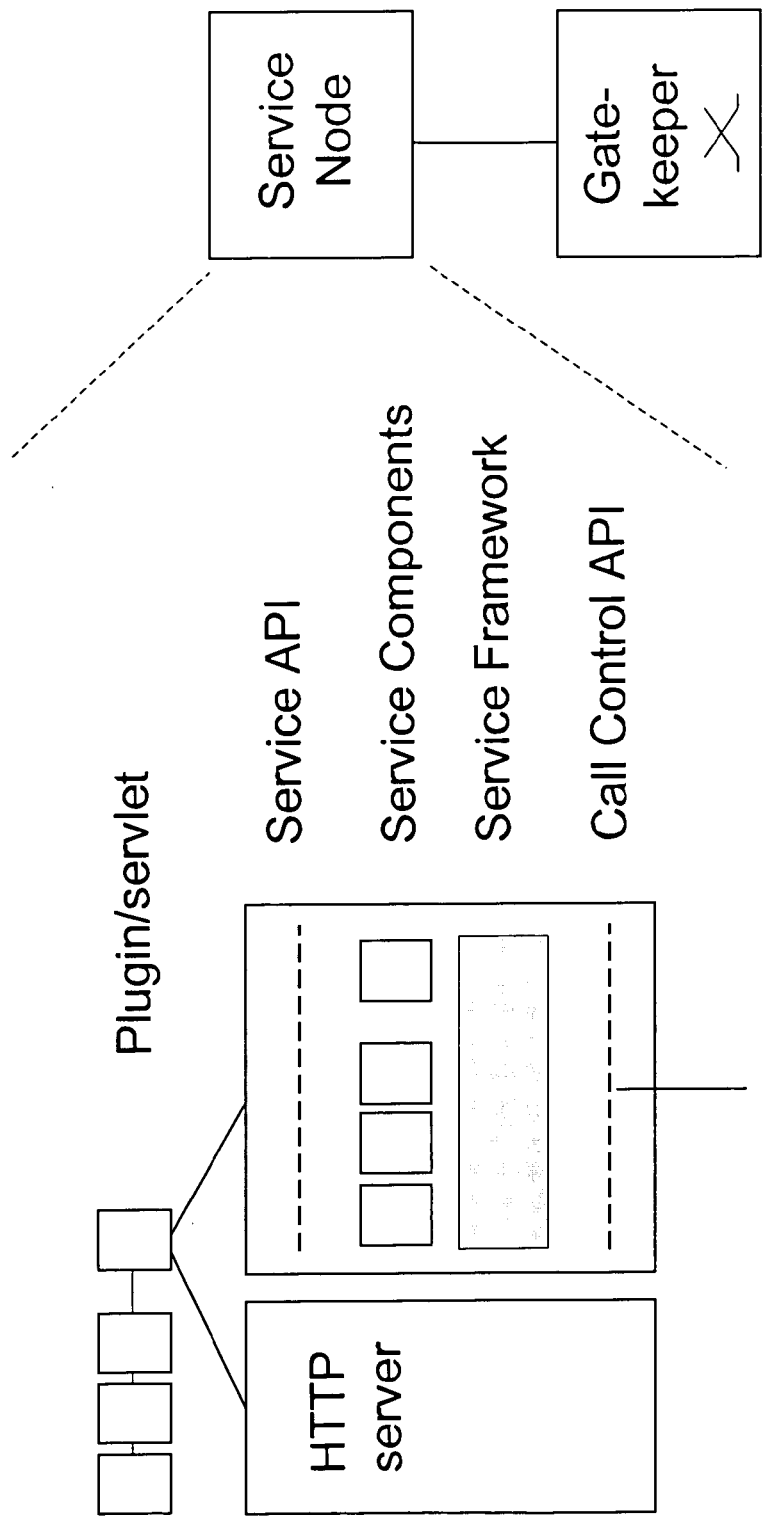

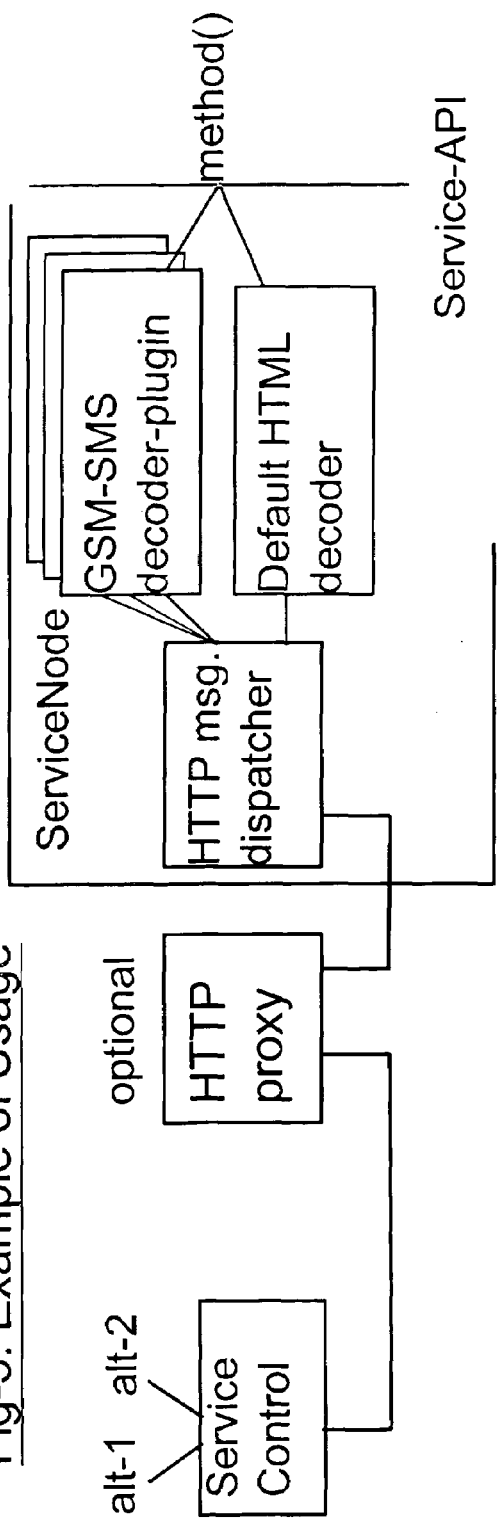

Fig-5: Example of Usage alt-1 (std. example):
HTTP POST http://ApN.domain/cmd
Content-type: text/html
Content-length: 378

...
<html><body>
cmd=callback
destination=etobn@eto.ericsson.se
userId=etoarni@eto.ericsson.se
</body></html> alt-2 (gsm example):
HTTP POST http://ApN.domain/cmd
Content-type: application/gsm-sms
Content-length: 562

...
<GSM-SMS message>

ADAPTION OF SERVICES IN A TELEPHONE NETWORK

FIELD OF THE INVENTION

The present invention relates to an arrangement for improving the service architecture for a compound telephone network, comprising several types of access/protocols as well as comprising parallel service nodes.

In other words, the present invention finds its application in the field of H.323 and service control.

BACKGROUND OF THE INVENTION

The present invention has been developed in connection with problems encountered when making service specific adaptations to the requirements of the individual customer in a network.

The problem is that the respective service logic is highly integrated into the switching logic of the core network. This means that new service logic and service adaptations may require changes in the core switching functions. This again makes it very hard to make customer specific adaptations to the service layer.

For example, big changes in the IN services can not be made without updating the switches in the network, i.e. even if the control in reality is between the handset and node 1 in the network, there is "transport equipment" that also has to be updated as service control uses the same control data/mechanisms/paths as these transport nodes.

KNOWN SOLUTIONS AND PROBLEMS WITH THESE

As explained above the main problem with traditional networks is that the service control protocols are integrated with lower layer functions such as call and media control. This binds the service control plane to lower layer functions such as basic switching functions and introduce system couplings that make customisation of service control expensive.

The service control and services are thus often tied to given access protocols. This often leads to building of parallel service networks with minor differences in protocols and services. Each service network then solves the service issues for one specific type of net. This typically results in costly and ineffective service development frameworks that are inflexible, costly and hard to maintain.

For the IP telephone networks as defined by the H.323 standard, the service control protocol is defined by the H.450 standards-suite. This defines an in-band service control protocol that is carried within the H.225.0 call control plane (a defined subset of Q.931). This protocol defines a set of ASN.1 service control messages that are used for invoking and controlling services. The problems with this approach is summarized as:

Introduction of new services requires updates of H.450 messages and decoding logic in the gatekeeper. This slows down introduction of service logic as it requires both a standardisation process and updates to the switch control plane.

Adaptation of service control to vendor specific control messages/logic becomes impossible (or costly) as it relates to the switching core.

Integration and interworking with messaging protocols becomes heavier as it requires more transcoding of messages. The user-user messages and user-service messages are carried within the same messages and framing. In order to identify user-service messages, all messages need to be analysed—not only those addressed for services. The protocol is ASN.1 encoded and does not easily integrate with MIME encoded messaging services.

OBJECTS OF THE INVENTION

An object of the present invention is to provide an arrangement, by which a cost effective and adaptive service architecture for a compound network comprising several types of access, can be implemented in a far more expedient and versatile manner.

Another object of the present invention is to provide an arrangement, by which the service networks can more easily be integrated and developed.

Still another object of the present invention is to provide an arrangement whereby the service architecture and access technologies are made more flexible and more easy to maintain.

BRIEF SUMMARY OF THE INVENTION

The above objects are achieved in an arrangement comprising an open service control protocol allowing support of access specific protocols and services while also allowing the respective access networks to share the same access nodes and service architectures, said open service control protocol is adapted for removing the coupling between the access/service technology and the switching logic in the core network.

In other words, the invention aims at customization of service control protocols by allowing the service control to be specialised independently from the other control functions such as call control and media control.

The invention proposes to use an open service control protocol that allows for a more cost-effective support of access specific protocols and services while also allowing the respective access networks to share the same service nodes and service architectures. The solution also aims at removing the coupling between the access/service technology and the switching logic in the core network. The proposed solution is based on H.323 being extended with HTTP for the service control.

Further features and advantages will appear from the following description taken in conjunction with the enclosed drawings, as well as from the enclosed patent claims.

BRIEF DISCLOSURES OF THE DRAWINGS

FIG. 1 is a schematical layout illustrating multiple access type and service node architecture.

FIG. 2 is a schematical layout illustrating the general principle of the present invention, comprising composed single service node with plugin architecture, giving homogeneous architecture with access adapters.

FIG. 3 is a simplified block diagram illustrating a reference model according to the present invention.

FIG. 4 is a schematical layout illustrating a service node structure according to an embodiment of the present invention.

FIG. 5 is a schematical layout illustrating an example of usage according to the present invention.

DETAILED DESCRIPTION OF EMBODIMENTS

In FIG. 1 there is in a schematical layout illustrated a prior art multiple access type and service node architecture.

In order to solve the problems related to the service architecture for such a compound network comprising several types of access, as well as comprising parallel service nodes/networks for respective access technologies, it is according to the present invention suggested to use an open service control protocol, as this will be discussed in further detail with reference to FIG. 2.

FIG. 2 illustrates a homogeneous service architecture with access adapters, according to the present invention, by which the open service control protocol can be implemented, so as to allow for a more cost effective support of access specific protocols and services while also allowing active access networks to share the same service nodes and service architectures.

With the suggested solution which can be embedded in the general layout according to FIG. 2, it is also possible to remove the coupling between the access/service technology and the switching logic in the core network.

The proposed solution is based on H.323 being extended with HTTP for service control.

More specifically, the proposed solution replaces the H.450 standards suites with the more open and extendable HTTP protocol. The solution also makes use of the feature set of HTTP to add the required flexibility. Among these features are found:

HTTP Tunnelling

The tunnelling feature refers to the use of the HTTP transport layer protocol for carrying other data protocols (in which case the HTTP headers carry information about what kind of payload type/protocol that is being carried).

Server Side Plugin

The plugin approach represents the server side equivalent of browser plugins where $3^{rd}$ party plugins (objects/functions) can be added dynamically. The invocation of a plugin is controlled through the content-type field or through selections/filters on the given path. The binding between the plugin and the invocation criteria is set through configuration.

Servlet Functions

The servlet approach relates to servlet objects that implements CGI like functions, but may add persistency over sessions and is object oriented.

Description of Solution

The invention disclosure relates to an H.323 based telephone network where clients makes phone calls through a central call-/control processing switch called a gatekeeper. The gatekeeper performs call-/control processing functions such as charging, routing and resource control and may also activate call related services on a service node according to the call states and the user profiles. When the client and the gatekeeper talks different languages/dialects, an access node is added in between to perform the required gateway functions.

In FIG. 3 there is illustrated a simplified network reference model.

This invention disclosure proposes to replace the H.450 based service control protocol between the access nodes and the gatekeeper/service node with an HTTP based protocol. This means that service configuration- and control messages are being HTTP encoded by the access nodes and decoded, analysed and executed by the service node. This again means that there is no normalization of the service protocols in the access nodes and that the mapping from the access specific service data to the service node languages are performed by service node plugins/servlets.

The service node represents a set of software processes capable of executing phone services and interacting with the gatekeeper. The service node thus provides a set of service functions and offers a programming API for service execution and control. The service node does also provide an HTTP server that supports HTTP tunnelling, servlets and server side plugins. Through the use of this HTTP server it is possible to write a plugin or servlet that interacts with the programming API in order to control the service execution. An example of this could be a plugin that translates DTMF codes to API method calls, e.g. DTMF '*23*1*1530#' may translate to API method 'userIsBusyTo(15.30)'.

In FIG. 4 there is given an illustration of the service node architecture.

In order to provide acceptable service availability the service node and the HTTP server will need to support installations of new plugins/servlets in runtime. Further, the architecture needs to be such that faulty plugins, servlets or sessions does not impair the operation of the service node.

The described architecture and feature set supports access specific service control messages as well as customer specific adaptation of the service network and the service control protocols, though within the limits of the feature set of the service API. This is illustrated through the following two examples.

In order to add an access specific service control protocol such as QSIG, the vendor would need to write an access node and a service plugin/servlet.

The QSIG access-node would translate the call- and connection control messages into the H.323 format, but would tunnel the QSIG messages inside HTTP messages and address these to the service node.

A QSIG plugin/servlet would be written and installed on the HTTP server of the service node. The logic of this plugin/servlet would translate the QSIG messages into method calls (and capability sets) in the service API. When a QSIG service control message is sent from a PBX, the access node will wrap the QSIG message into an HTTP frame and send it to the service node. The HTTP server on the service node will receive the package, detect that the format is something called QSIG, look up in its configuration data and activate the correct plugin/servlet for QSIG. This plugin/servlet will analyse the QSIG message, make method calls in the API and return the appropriate QSIG encoded response.

When new features are added to the service node and the service API, the updates can be provided to the access specific parts through updates of the plugins/servlets, i.e. there are no updates required in the access nodes.

In order to add a provider specific service control protocol e.g. based on GSM-SMS, the provider would need to write a plugin/servlet that translates the GSM-SMS messages into method calls over the service API. The procedures are as defined above, but in this case an external $3^{rd}$ part can do provider specific customisation to the service network without being tied up to new deliveries of the core system. In FIG. 5 it is illustrated the GSM-SMS example alongside a default option.

Advantages

Added Flexibility

The service control protocol is more flexible in terms of supporting different service control data formats/encoding standards. For each new encoding standard, a new plugin needs to be encoded.

Simplicity

The service control protocol becomes more flexible in that it is simpler to add new service control messages and supporting these. It becomes simpler to debug the system, to secure the message transport (cf. SSL) and to get the data through firewalls and proxies.

Customisation

The solution allows the service provider to add provider specific service control messages independent from the system solution provider. This means that a provider can add new control messages for decoding these independent from the system provider (e.g. add a new SMS message and update the plugin for decoding this)

Performance

The messages are being addressed towards the correct recipient, meaning that the gatekeeper does not need to analyse all messages (incl. user-user msg.) in order to pick up the user-service data.

Broadening

1) Integration with Messaging Applications

The HTTP service control format follows the MIME encoding standard that is used by SMTP, NTTP and S/MIME messaging applications. It is expected that it should be possible to integrate this service control with these messaging applications.

2) Support for Notification Services

The principle can be extended to allow the application server to issue HTTP messages/notifications to the clients (e.g. when the client registers). This can for example be used for notifying the user about new e-mail messages in the in-box.

3) Extensions for Supporting the SIP Protocol

The SIP protocol builds on using the HTTP protocol and can probably be integrated into the system solution relatively simple if the application server supports call-from-the-blue services.

4) Terminal (Gateway) to Terminal (Gateway) Service Control

If two terminals (or their gateways) want to exchange service control/data they could exchange this service control/data on a language that they have agreed on. The respective entities (terminals or gateways) can also dynamically download transcoder servlets/plugins from a central depository upon need.

This could for example be used when user A on his PC is sending user B on a GSM terminal an email message. The GSM gateway decides that email is not understood and retrieves some transcoder for handling this email. The choice of transcoder can be selected according to user preferences, previous user behaviour, network or operator criteria. Examples of transcoders here could be:

Transcoder from email to GSM-SMS message
Transcoder from email to voice rendering
Transcoder from email to WAP 5) Access Control Based on Service Control Plugin The access to transcoder functions (servlets/plugins) can be controlled according to subscription profiles, user locations and other metrics of the system. Further more can the invoked transcoder function apply access control on the specific information elements of the service control/data protocols. This could e.g. be used to control when and from where a given service is used and what kind of service data that is legal in the given context. An example could be to filter on the contents of a GSM-SMS message to ensure that no pornographic data is being transmitted. (The transcoder would in this case act as an application layer firewall.)

APPENDIX

Terminology

ITU-H.323 A family of ASN.1 encoded protocols defining message formats, encoding standards and call state sequences of multimedia conferences on an Internet protocol infrastructure.

ITU-H.225.0 A subset of the F.323 standards suite being based on Q.931 and defining call control messages, encoding standards and call-state sequences.

ITU-H.450 A suite of ASN.1 standards defining service control protocols to be used for service control in an H.323 network. The E.450 messages are being carried within H.225.0 messages.

ITU-Q.931 Telephony standard for call control that defines call control messages, encoding standards and call-state sequences.

ASN.1 Abstract Syntax Notation Number 1
    A formal data structure definition language
HTTP A MIME (ascii) encoded protocol for transport of world-wide-web data. The protocol is open for tunnelling of other protocols.

CGI Common Gateway Interface
    A script language used for customisation of web page contents
API Application Programming Interface
DTMF Dual Tone Multiple Frequency
QSIG A service control protocol used by PBX
PBX Private Branch Exchange
GSM Global System for Mobile Communication
    A widely employed standard for mobile communication
SMS Short Message Service
    Messaging service protocol employed within GSM
SSL Secure Socket Layer
    Security protocol employed for Transport Layer Security
MIME Multipart Information Message Entity Protocol encoding format based on ascii characters
SIP Session Initiation Protocol
    IP Telephony protocol based on HTTP
SMTP Simple Mail Transfer Protocol
    Protocol for transport/exchange of email messages
NTTP Network News Transfer Protocol
    Protocol for transport/exchange of news messages
S/MIME Secure MIME
WAP Wireless Access Protocol
    A web protocol for mobile devices (i.e. 'akind-of'HTTP for mobile handsets)

The invention claimed is:

1. A service control node which executes telephony services in a compound telephone network in which service control is decoupled from core switching logic, comprising:
    a server which receives a service control protocol message, the service control protocol message having been wrapped in a tunneling protocol;
    a plugin/servlet for the service control protocol which:
        (1) is activated by the server to analyze the message;
        (2) interacts with an application programmable interface (API) for service execution and control;

(3) returns an appropriate response encoded in the service control protocol.

2. The node of claim 1, wherein the tunneling protocol is HTTP (Hyper Text Transport Protocol).

3. The node of claim 1, wherein the tunneling protocol is SIP (Session Initiation Protocol).

4. A method for providing services in a telephone network, said network including a number of access nodes with several types of access/protocols, as well as a number of service nodes, said method including using a H.323-based protocol for communication across Internet Protocol based networks, encoding service configuration and control messages with Hyper Text Transport Protocol or Session Initiation Protocol in the access nodes, and decoding, analyzing and executing said service configuration and control messages in the service nodes.

5. A method as claimed in claim 4, said method including encoding and decoding said service configuration and control messages using the features set of the Hyper Text Transport Protocol, said features including:
   Hyper Text Transport Protocol tunnelling,
   Service Side Plugins, and
   Servlet Function.

6. A method as claimed in claim 5, said method including mapping from access specific service data to service node language in service node plugins/servlets.

7. A method as claimed in claim 6, wherein said service nodes represent a set of software processes being capable of executing phone services and interacting with gatekeepers in the network, said service nodes providing a set of service functions and offering an Application Programming Interface for service execution and control, said method including controlling the service execution by letting said plugins or servlets interact with said Application Programming Interface.

8. A method as claimed in claim 7, said method including translating from access specific service control to generic service Application Programming Interface method calls in said plugins.

9. A method as claimed in claim 8, said method including tunnelling the access specific service control data to plugins/servlets by use of Hyper Text Transport Protocol in said access nodes, and transcoding this access specific control to said generic Application Programming Interface method calls in said plugins/servlets.

10. A method as claimed in claim 7, said method including automatically selecting a correct plugin/servlet according to configured rules in the servers and the type of service control data being signalled, the type of data being indicated by the Hyper Text Transport Protocol.

11. A method as claimed in claim 7, said method including formatting return codes/states from generic Application Programming Interface calls to specific return codes/states in the plugins/servlets, and return said access specific codes/states using Hyper Text Transport Protocol.

12. A method as claimed in claim 11, said method including dynamically downloading transcoder servlets/plugins to said nodes from a central repository upon need.

13. A method as claimed in claim 4, wherein the service control protocol is decoded from core switching logic.

14. A method as claimed in claim 4, wherein the service control protocol is independent from call control and media control.

* * * * *